United States Patent
Kawano

(10) Patent No.: US 7,047,504 B2
(45) Date of Patent: May 16, 2006

(54) METHOD AND PROGRAM FOR DESIGNING SEMICONDUCTOR INTEGRATED CIRCUITS TO OPTIMIZE CLOCK SKEWS ON PLURALITY OF CLOCK PATHS

(75) Inventor: Tetsuo Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 10/369,535

(22) Filed: Feb. 21, 2003

(65) Prior Publication Data
US 2003/0177454 A1 Sep. 18, 2003

(30) Foreign Application Priority Data
Mar. 14, 2002 (JP) .............................. 2002-069810

(51) Int. Cl.
*G00F 17/50* (2006.01)
(52) U.S. Cl. .................. 716/2; 716/2; 716/4; 716/6
(58) Field of Classification Search ................ 713/400; 700/28; 716/6, 4, 2; 438/620
See application file for complete search history.

(56) References Cited

U.S. PATENT DOCUMENTS

| | | | | |
|---|---|---|---|---|
| 5,557,779 | A * | 9/1996 | Minami ......................... | 716/6 |
| 5,740,067 | A * | 4/1998 | Hathaway ....................... | 716/6 |
| 5,956,256 | A * | 9/1999 | Rezek et al. .................... | 716/3 |
| 6,550,044 | B1 * | 4/2003 | Pavisic et al. .................. | 716/6 |
| 6,594,807 | B1 * | 7/2003 | Tetelbaum et al. ............. | 716/6 |
| 6,725,389 | B1 * | 4/2004 | Tetelbaum et al. ........... | 713/400 |
| 6,883,154 | B1 * | 4/2005 | Teig et al. ...................... | 716/7 |
| 2003/0023327 | A1 * | 1/2003 | Chang et al. .................. | 700/28 |

OTHER PUBLICATIONS

E. Friedman, "Clock Distribution Networks in Synchronous Digital Integrated Circuits", p. 665-692, Proceedings of IEEE, vol. 89, No. 5, May 2001.*
J. Fishburn, "Clock Skew Optimization", IEEE Transactions on Computers, p. 945-951, vol. 39, No. 7, Jul. 1990.*

(Continued)

Primary Examiner—A. M. Thompson
Assistant Examiner—Tuyen To
(74) Attorney, Agent, or Firm—Staas & Halsey LLP

(57) ABSTRACT

A method for designing semiconductor integrated circuits that efficiently optimizes clock skews in a plurality of clock modes in the case of designing semiconductor integrated circuits having a plurality of clock modes. A plurality of clock paths in each of a plurality of clock modes are detected from layout data for a semiconductor integrated circuit. Delay time in all elements on each of the plurality of clock paths detected is collected. A delay adjustment position is set on each of the plurality of clock paths detected. An optimum delay value at the delay adjustment position on each of the plurality of clock paths is calculated by considering delay time at the set delay adjustment position as a nonnegative variable, by formulating a linear expression for each of the plurality of clock paths by use of this variable and the collected delay time in all of the elements, and by working out the linear expression. Circuit structure based on the layout data is corrected automatically by locating a delay element having appropriate delay time at each delay adjustment position on the basis of the delay value calculated.

23 Claims, 10 Drawing Sheets

OTHER PUBLICATIONS

T. Szymanski et al., "Verifying Clock Scheldules", p. 124-131, Computer Aid Design. ICCAD-92. Digest of Technical papers., 1992 IEEE/ACM International Conference on Nov. 8-12, 1992.*

* cited by examiner

METHOD AND PROGRAM FOR DESIGNING SEMICONDUCTOR INTEGRATED CIRCUITS TO OPTIMIZE CLOCK SKEWS ON PLURALITY OF CLOCK PATHS

CROSS-REFERENCE TO RELATED APPLICATIONS

This application is based on, and claims priority to, Japanese Application No. 2002-069810, filed Mar. 14, 2002, in Japan, and which is incorporated herein by reference.

BACKGROUND OF THE INVENTION (1) Field of the Invention

This invention relates to a method and program for designing semiconductor integrated circuits having a plurality of clock modes and, more particularly, to a method and program for designing semiconductor integrated circuits which can optimize clock skews on a plurality of clock paths in each clock mode.

(2) Description of the Related Art

In recent years the integration levels of LSIs have been increased and they have become minuter. With this, processing by one LSI has become large in scale and LSIs more complicated and sophisticated than conventional ones can be realized. Clock signals more complicated than conventional ones are used in many of these sophisticated LSIs. For example, there are LSIs having a plurality of clock modes, such as a clock signal usually used and a clock signal used to perform a test. Gated clock circuits or the like which cut off the supply of clock signals except the period during which a flip-flop updates data are also used as a method for reducing consumption of power.

However, if clock signals are complicatedly used in this way, a clock skew may increase due to an increase in the number of gates on a path, an increase in load, and the like and normal clock timing may not be obtained at, for example, a flip-flop circuit in a circuit. Timing correction for clock skews is needed for each clock signal, especially if a circuit has a plurality of clock modes.

Conventionally, optimization has usually been performed in one of a plurality of clock modes to determine the layout when a circuit having these clock modes is designed. Therefore, when this circuit operates in another clock mode, a path on which a new timing error occurs may appear. With some sophisticated LSIs, it is very difficult to cause clock timing to match in all clock modes. Conventionally, in such a case a designer has manually performed a skew adjustment in each clock mode. As a result, a great many man-hours have been needed.

FIG. 10 is a view showing an example of the circuit structure of an LSI having a plurality of clock modes.

In FIG. 10, an example of the circuit structure of a part of the input end of an LSI is shown. Two clock signals are supplied to this circuit. That is to say, a clock signal CLK usually used and a test clock signal TCK used to test the operation of the circuit are supplied. A clock signal CLK branches via a cell C71. One is supplied clock signal CLK branches via a cell C71. One is supplied to an input terminal A72 of a selector S72 and the other is supplied to an input terminal A74 of a selector S74 via an OR gate G73. A test clock signal TCK branches via a cell C75. One is supplied to an input terminal B72 of the selector S72 and the other is supplied to an input terminal B74 of the selector S74.

A test signal TST is supplied both to the selector S72 and to the selector S74 via a cell C76. Switching between output of a clock signal CLK and a test clock signal TCK is performed by this test signal TST. As a result, a clock mode is switched.

A signal output from an output terminal X72 of the selector S72 branches via cells C77 and C78 and is input to clock input of flip-flop circuits FF79 and FF80. A signal output from the selector S74 branches via a cell C81 and is input to clock input of flip-flop circuits FF82 and FF83. A signal output from the flip-flop circuit FF80 is input to data input of the flip-flop circuit FF83. A signal output from the flip-flop circuit FF82 is input to data input of the flip-flop circuit FF79.

A control signal EN is input to the other input terminal B73 of the OR gate G73 to which a clock signal CLK is input, so that a gated clock circuit is formed. That is to say, when a control signal EN at the H level is input at normal operation time, a clock signal CLK output to the flip-flop circuits FF82 and FF83 is kept at the H level and the update of data output from the flip-flop circuits FF82 and FF83 is stopped.

It is assumed that a signal path for a clock signal CLK from input through the cell C71, selector S72, and cells C77 and C78 to the flip-flop circuits FF79 and FF80 is a clock path CP710 and that a signal path for a clock signal CLK from input through the cell C71, OR gate G73, selector S74, and cell C81 to the flip-flop circuits FF82 and FF83 is a clock path CP720. Moreover, it is assumed that a signal path for a test clock signal TCK from input through the cell C75, selector S72, and cells C77 and C78 to the flip-flop circuits FF79 and FF80 is a clock path CP810 and that a signal path for a test clock signal TCK from input through the cell C75, selector S74, and cell C81 to the flip-flop circuits FF82 and FF83 is a clock path CP820.

As stated above, conventionally, optimization has usually been performed in one of a plurality of clock modes to determine the layout when a circuit having these clock modes is designed. With the above circuit, for example, the layout has generally been determined by adjusting clock skews so that normal operation will be realized by use of a clock signal CLK for normal operation. Therefore, the clock paths CP710 and CP720 are taken into consideration to adjust clock skews. However, in reality operation on the clock paths CP810 and CP820 by a test clock signal TCK must also be guaranteed. Therefore, the clock paths CP810 and CP820 must also be taken into consideration to adjust clock skews.

When this circuit operates in the other clock mode, a path on which a new timing error occurs may appear. Conventionally, in such a case a designer has manually performed an adjustment by inserting or changing cells with clock skews on all paths taken into consideration. With some sophisticated LSIs in which clock signals are used in a complicated manner, however, it is very difficult to cause clock timing on all paths to match in operation in all clock modes. Moreover, if clock skews are in an unbalanced state, there are many cases where a significant change in circuit is needed to correct a setup/hold error between flip-flops. In these cases a circuit correction, buffer insertion, and the like must be made in many places. Therefore, manual operations by a designer needs a great many man-hours, resulting in very low efficiency in operations.

SUMMARY OF THE INVENTION

The present invention was made under the background circumstances as described above. An object of the present invention is to provide a method for designing semiconductor integrated circuits in which clock skews in a plurality of clock modes can be optimized efficiently in the case of designing semiconductor integrated circuits having the plurality of clock modes.

Another object of the present invention is to provide a program for designing semiconductor integrated circuits in which clock skews in a plurality of clock modes can be optimized efficiently in the case of designing semiconductor integrated circuits having the plurality of clock modes.

In order to achieve the above first object, a method for designing a semiconductor integrated circuit having a plurality of clock modes is provided. This method for designing a semiconductor integrated circuit comprises the steps of detecting a plurality of clock paths in each of the plurality of clock modes from layout data for the semiconductor integrated circuit, collecting delay time in all elements on each of the plurality of clock paths detected, setting a delay adjustment position on each of the plurality of clock paths detected, calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and the variable, and by working out the linear expression, and automatically correcting circuit structure based on the layout data by locating a delay element having appropriate delay time at each of the delay adjustment positions on the basis of the delay value calculated.

Furthermore, in order to achieve the above second object, a design program for designing a semiconductor integrated circuit having a plurality of clock modes is provided. This design program causes a computer to perform the processes of detecting a plurality of clock paths in each of the plurality of clock modes from layout data for the semiconductor integrated circuit, collecting delay time in all elements on each of the plurality of clock paths detected, setting a delay adjustment position on each of the plurality of clock paths detected, calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and the variable, and by working out the linear expression, and automatically correcting circuit structure based on the layout data by locating a delay element having appropriate delay time at each of the delay adjustment positions on the basis of the delay value calculated.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
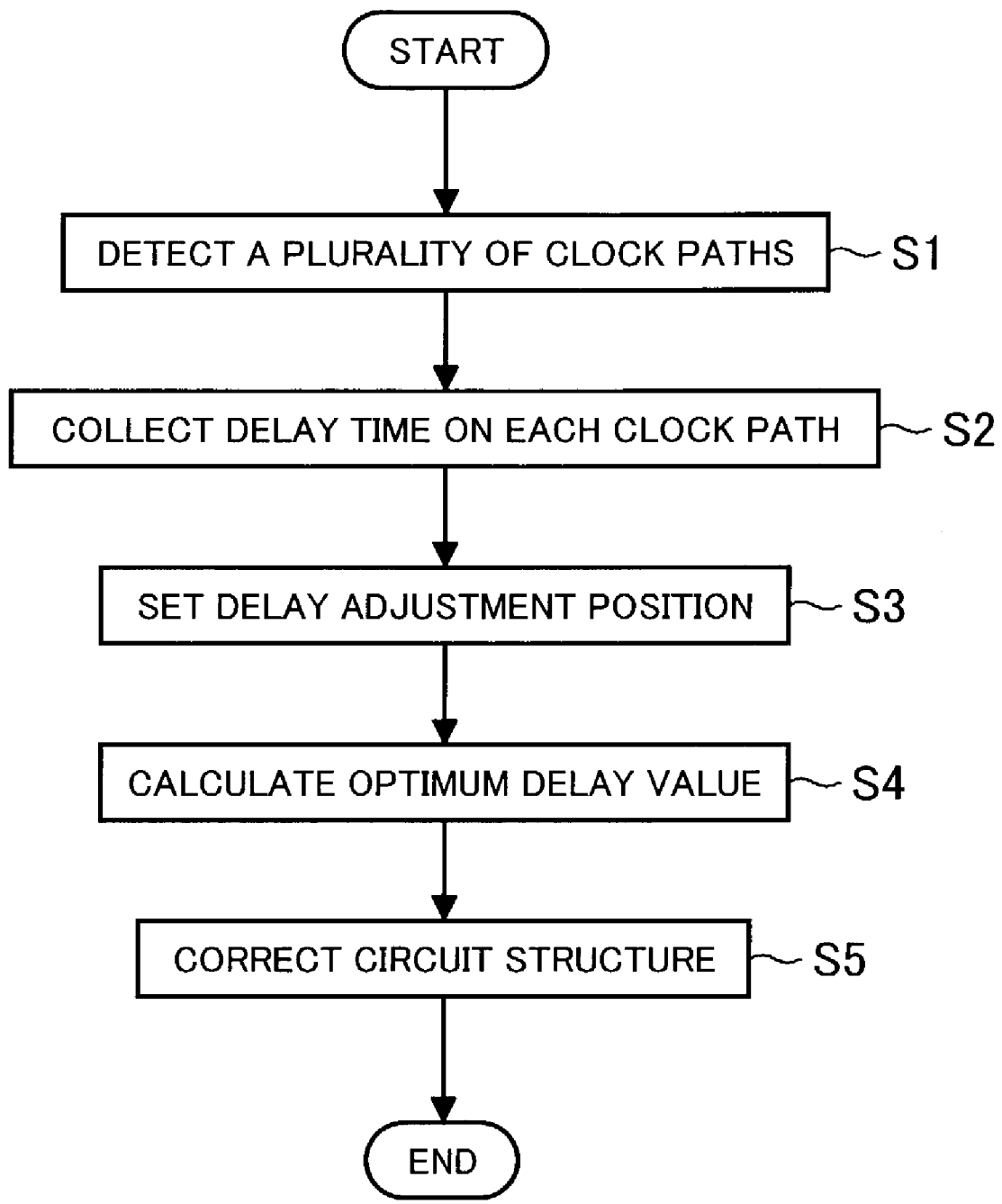
FIG. 1 is a flow chart showing the flow of processes in a method for designing semiconductor integrated circuits according to the present invention.

FIG. 1 is a flow chart showing the flow of processes in a method for designing semiconductor integrated circuits according to the present invention. An overview of a method for designing semiconductor integrated circuits according to the present invention will now be given by the use of FIG. 1 on the assumption that processed layout data and data, such as a netlist, have a file format which an information processing unit controlled by a processor can treat.

In the present invention, on the basis of, for example, information for specifying various elements and cells, such as flip-flop circuits and selectors, included in an objective semiconductor integrated circuit and a netlist in which information regarding, for example, the connection of these elements and cells is described, layout data indicative of the state of the layout of the circuit will be given. Moreover, the semiconductor integrated circuit based on this layout data has a plurality of clock modes. This semiconductor integrated circuit accepts a plurality of clock signals (a clock signal for ordinary operation and a clock signal for testing, for example) input and operates in compliance with each clock signal. Alternatively, an element having a plurality of operation modes based on a plurality of signals obtained by demultiplying a clock signal input exists in the circuit.

In the present invention, such layout data is corrected automatically so that clock skews which occur in a plurality of clock signals input will fall within a predetermined range at a predetermined element, such as a flip-flop, included in a semiconductor integrated circuit based on the layout data and so that this element will operate normally in each clock mode. Therefore, a plurality of clock signal paths (hereinafter referred to as clock paths) in each clock mode are detected and a delay adjustment position is set on each clock path. Then delay time needed at each delay adjustment position is calculated by, for example, linear programming so that a clock skew on each of the plurality of clock paths detected will fall within a target range. After that delay elements are located to correct circuit structure.

Now, descriptions will be given with reference to FIG. 1. It is assumed that layout data has been created on the basis of, for example, a netlist. In step S1, this layout data is analyzed and a plurality of clock paths in each clock mode are detected. For example, an element, such as a flip-flop, which operates in a plurality of clock modes is extracted from a circuit and a plurality of clock paths for each of clock signals input to this element from input is detected from the layout data. In this case, all clock paths in each clock mode should be detected.

In step S2, delay time in all elements on each of the clock paths detected is collected from, for example, a library and delay time on all of the clock paths is calculated.

In step S3, a delay adjustment position on each of the clock paths detected in step S1 is set. An example of a method for setting this delay adjustment position is as follows. An element with a plurality of input terminals via which a plurality of clock paths meet one another is extracted from elements on each of the clock paths detected and a position just before an input terminal of this element is set as a delay adjustment position.

Moreover, the method of not setting a position, which is set by the above method for setting a delay adjustment position called, for example, setting rule R1 and which meets the following condition of setting rule R2, as a delay adjustment position can be adopted. An element extracted in compliance with setting rule R1 as the one where a plurality of clock paths meet one another is called a first meeting element. Whether or not an element located just before a position on the clock path in question set in compliance with setting rule R1 is a second meeting element where a plurality of clock paths meet one another is judged. If this element is the second meeting element, then whether or not there is a branch point on the clock path between the position set in compliance with setting rule R1 and the second meeting element is judged. If there is no branch point, then this delay adjustment position is removed.

A minimum number of delay adjustment positions are set on each clock path by these methods for setting a delay adjustment position, so the number of positions corrected later at circuit structure correction time decreases. This prevents the scale of circuits from expanding.

In step S4, delay time at the set delay adjustment position is considered as a variable. A linear expression for each clock path is formulated by the use of this variable and collected delay time in elements, the value of the variable is found, and an optimum delay value at a delay adjustment position on each clock path is calculated. The values of all of these variables are greater than zero.

In this case, a linear expression should be formulated so that, for example, the sum of the collected delay time in all elements on each of the clock paths detected and the variable will fall within a predetermined range. By doing so, a clock skew on each clock path will fall within a range necessary for normal operation. Moreover, when these linear expressions are worked out, optimization conditions are set so that, for example, the sum of delay time at all of the set delay adjustment positions will be minimized, and the values of variables are calculated by linear programming. As a result, minimum delay time for optimizing clock skews is found as the values of the variables.

In step S5, a delay element having appropriate delay time is located at each delay adjustment position on the basis of delay values calculated to automatically correct circuit structure based on the layout data. In this case, circuit structure is corrected by, for example, one of the following two methods. A first correction method is as follows. A delay element cell having delay time closest to a delay value calculated in, for example, step S4 is selected from among a group of delay element cells prepared in advance in a library or the like to correct circuit structure based on the layout data. A second correction method is as follows. Data for single delay elements prepared in advance is combined to create data for a new delay element having delay time corresponding to a delay value calculated. Then this data is used to correct circuit structure based on the layout data. The second correction method may be used if there is no cell in the first correction method that can be selected for a calculated delay value.

Furthermore, in the above first and second correction methods, circuit structure may be corrected by directly changing layout data when a selected cell or a created delay element is inserted. Circuit structure may also be corrected by changing information regarding connection included in a netlist on the basis of data regarding a selected cell or a created delay element and by changing layout data according to this change in the netlist.

In the above method for designing semiconductor integrated circuits, a plurality of clock paths in each of a plurality of clock modes are extracted, an optimum delay vale at a delay adjustment position set on each clock path is calculated by linear programming, and a necessary delay element is automatically inserted. Therefore, compared with conventional cases where a designer has taken a great many man-hours and a long time to perform operations manually, a change in design for optimizing clock skews can be made efficiently in a short period of time.

A minimum number of delay adjustment positions are set on each clock path by applying setting rules R1 and R2 to the process in step S3. Moreover, if a delay value at each delay adjustment position is calculated in step S4, the minimum value of each optimum delay can be obtained by, for example, linear programming. This prevents an unnecessary delay element from being inserted. Therefore, a change in circuit structure to optimize clock skews can be minimized.

In the process of calculating delay time on each clock path in step S2 in the above method for designing semiconductor integrated circuits, the entire delay time is calculated only on the basis of delay time in elements on each clock path. However, the entire delay time may be calculated with not only delay time in elements but also delay time on wiring lines taken into consideration. In this case, in step S2 the entire delay time is calculated on the basis of delay time in elements and parameters, such as the length of a wiring line between elements. Furthermore, in step S4 a linear expression is formulated by the use of a delay value at a delay adjustment position, delay time in each element, and delay time on a wiring line.

As a result, clock skews can be optimized with not only delays in elements on each clock path but also wiring delays taken into consideration. Clock skews therefore can be adjusted more accurately.

Figure 2:
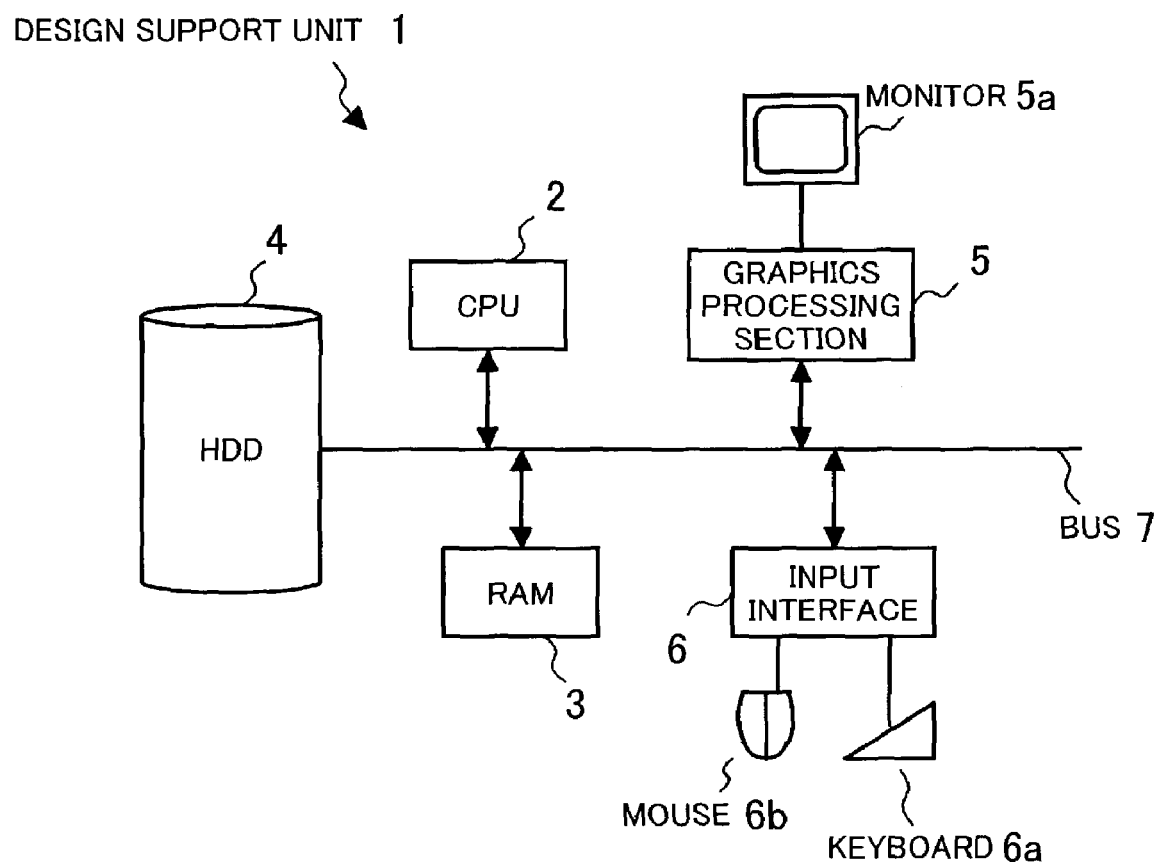
FIG. 2 is a block diagram showing an example of the internal structure of a design support unit for semiconductor integrated circuits to which the present invention is applicable.

Now, an example of the concrete structure of a unit for realizing the above method for designing semiconductor integrated circuits will be described. FIG. 2 is a block diagram showing an example of the internal structure of a design support unit for semiconductor integrated circuits to which the present invention is applicable.

As shown in FIG. 2, a design support unit 1 comprises a CPU 2, RAM 3, hard disk drive (HDD) 4, graphics processing section 5, and input interface (I/F) 6 which are connected to one another via a bus 7.

The CPU 2 controls the entire design support unit 1. The RAM 3 temporarily stores at least part of a program executed by the CPU 2 and various pieces of data needed when a process is performed by the use of this program.

The HDD 4 stores an OS, application programs, and various pieces of data. In the present invention, layout data created after the logical design procedure for a semiconductor integrated circuit to be designed, the corresponding data, such as a netlist and library, a design program for optimizing clock skews on the basis of the layout data, and the like are stored in the HDD 4.

A monitor 5a is connected to the graphics processing section 5. The graphics processing section 5 displays images on a screen of the monitor 5a in compliance with instructions from the CPU 2. A keyboard 6a and mouse 6b are connected to the input I/F 6. The input I/F 6 sends signals output from the keyboard 6a or the mouse 6b to the CPU 2 via the bus 7.

In addition to these components, a communication I/F, which is connected to an external communication network and which can accept input of, for example, layout data, a netlist, and the like regarding objects of correction via this network, may be connected to the bus 7. Moreover, a print processing section to which a printer for printing information, such as objects of correction, circuit structure after correction, and libraries may be connected to the bus 7.

The processing function of this embodiment can be realized by adopting the above hardware configuration. To be concrete, a program for designing semiconductor integrated circuits used to correct circuit structure on the basis of layout data given is loaded into the RAM 3 and is executed by the CPU 2. As a result, the processing function of this embodiment is realized.

Figure 3:
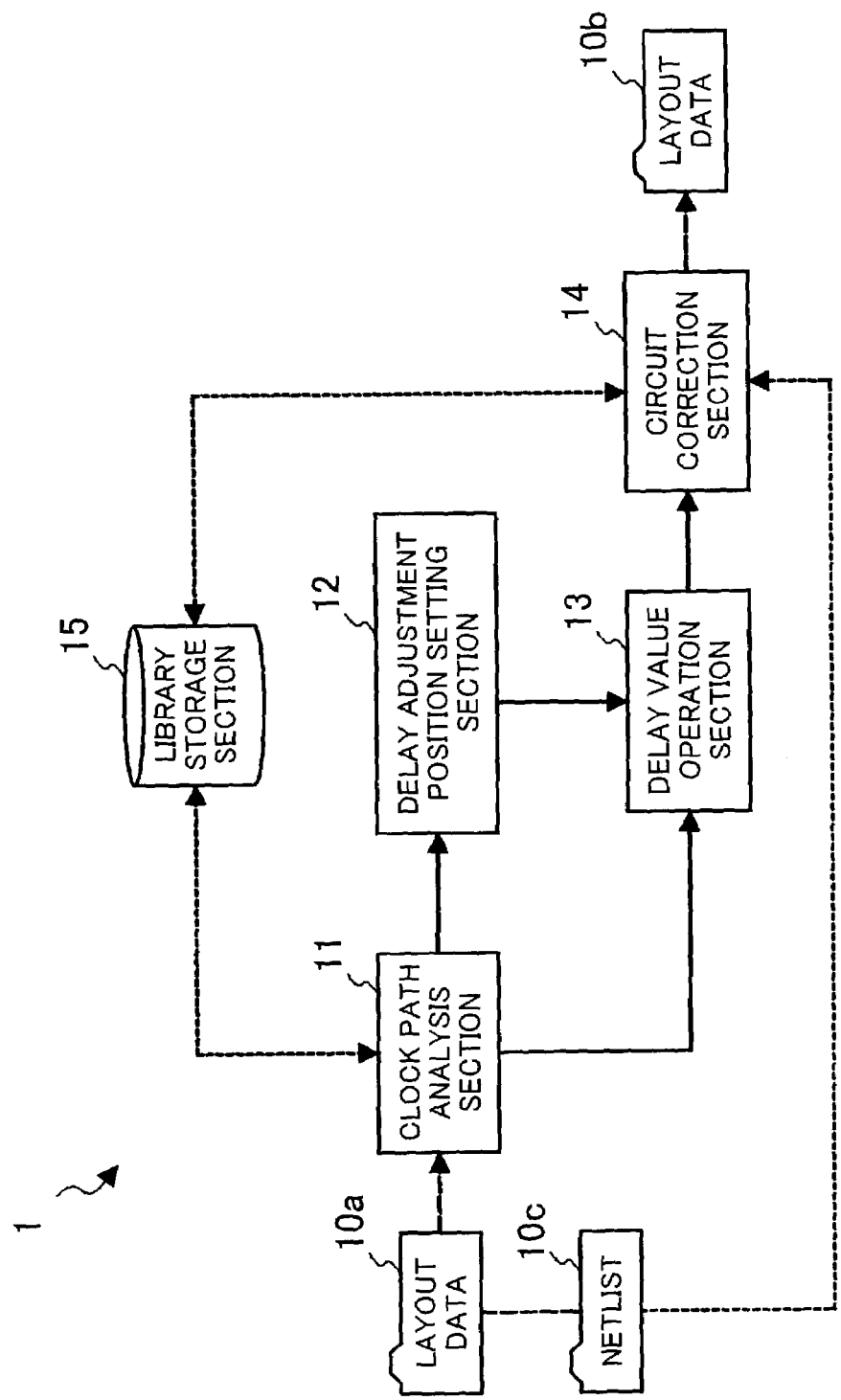
FIG. 3 is a functional block diagram showing an example of the processing function of a design support unit for semiconductor integrated circuits to which the present invention is applicable.

FIG. 3 is a functional block diagram showing an example of the processing function of the design support unit 1.

As shown in FIG. 3, the design support unit 1 comprises a clock path analysis section 11 for extracting all clock paths from layout data 10a input and analyzing them, a delay adjustment position setting section 12 for setting a delay adjustment position on each clock path extracted, a delay value operation section 13 for calculating a delay value at a delay adjustment position set, a circuit correction section 14 for outputting layout data 10b in which circuit structure has been corrected on the basis of a delay value calculated, and a library storage section 15 for storing a library in which various cells, such as elements, and information regarding the characteristics of elements are held. The layout data 10a given has been created on the basis of information for selecting cells or elements obtained from a library and a netlist 10c including information regarding the connection of them.

As described below, a process performed in each functional block in the design support unit 1 corresponds to each step on the flow chart shown in FIG. 1. The clock path analysis section 11 corresponds to steps S1 and S2, the delay adjustment position setting section 12 corresponds to step S3, the delay value operation section 13 corresponds to step S4, and the circuit correction section 14 corresponds to step S5.

That is to say, the clock path analysis section 11 detects clock paths in all clock modes from the layout data 10a and collects delay time in elements on each clock path. The delay adjustment position setting section 12 sets a minimum number of delay adjustment positions on each clock path detected. The delay value operation section 13 calculates a delay value needed at each delay adjustment position by linear programming on the basis of delay time in elements collected by the clock path analysis section 11 so that a clock skew on each clock path will fall within a target range. The circuit correction section 14 locates an optimum delay element according to a calculated delay value to correct circuit structure.

A library holds information regarding the characteristics of cells and elements, such as delay time, loads, and location sizes, usable to the layout data 10a, is stored in the library storage section 15, and is referred to properly from the clock path analysis section 11 and the circuit correction section 14.

Figure 4:
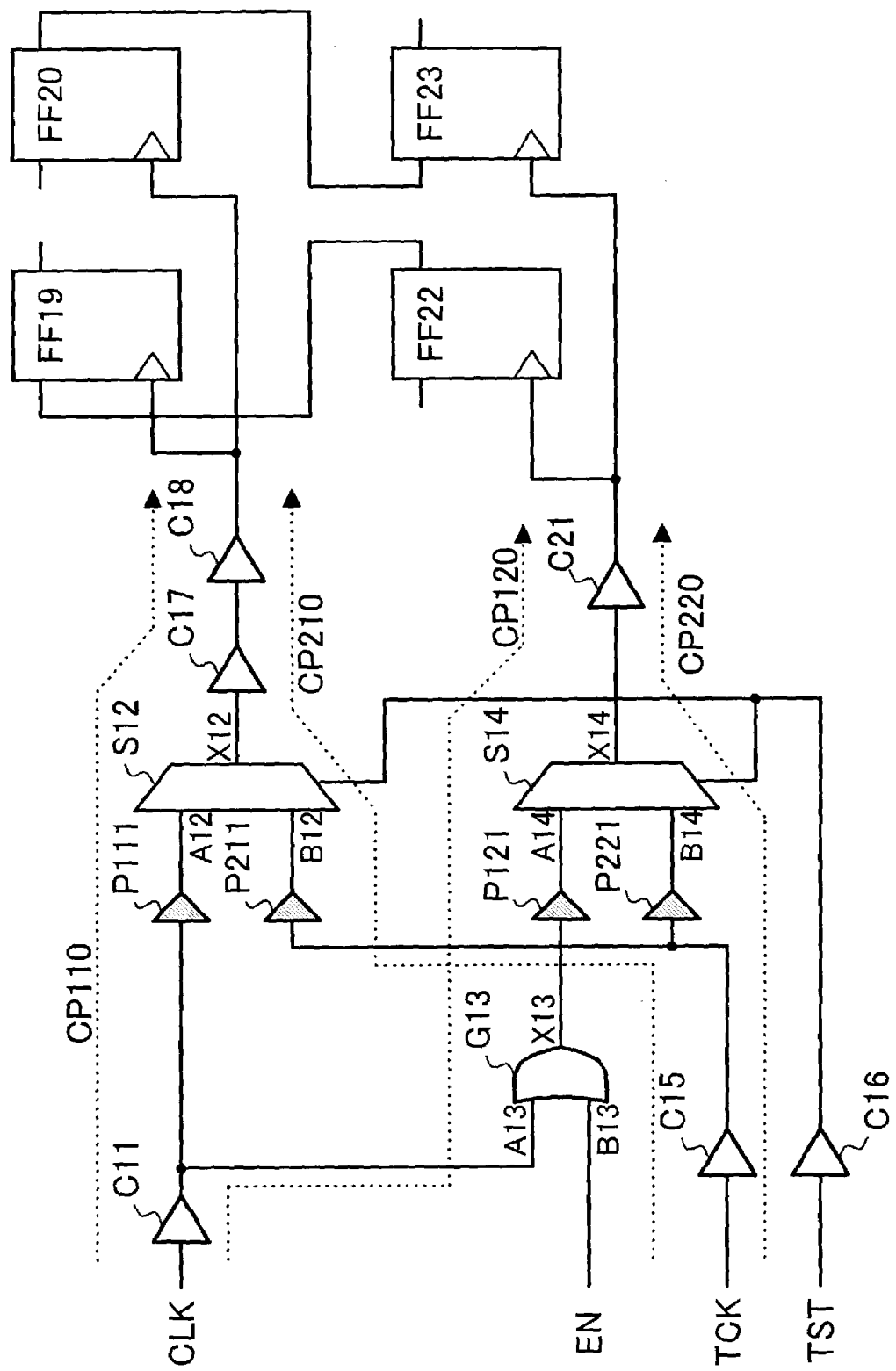
FIG. 4 is a view showing a first example of the circuit structure of a semiconductor integrated circuit given as layout data.

Now, a concrete example of the circuit structure of a semiconductor integrated circuit given as the layout data 10a will be cited to describe processes performed in the design support unit 1. FIG. 4 is a view showing a first example of the circuit structure of a semiconductor integrated circuit given as the layout data 10a.

In FIG. 4, an example of the circuit structure of a part of the input end of a semiconductor integrated circuit given as the layout data 10a is shown. Two clock signals are supplied to this circuit. That is to say, a clock signal CLK usually used and a test clock signal TCK used to test the operation of the circuit are supplied. A clock signal CLK branches via a cell C11. One is supplied to an input terminal A12 of a selector S12 and the other is supplied to an input terminal A14 of a selector S14 via an OR gate G13. A test clock signal TCK branches via a cell C15. One is supplied to an input terminal B12 of the selector S12 and the other is supplied to an input terminal B14 of the selector S14.

A test signal TST is supplied both to the selector S12 and to the selector S14 via a cell C16. Switching between output of a clock signal CLK and a test clock signal TCK is performed by this test signal TST. As a result, a clock mode is switched.

A signal output from an output terminal X12 of the selector S12 branches via cells C17 and C18 and is input to clock input of flip-flop circuits FF19 and FF20. A signal output from the selector S14 branches via a cell C21 and is input to clock input of flip-flop circuits FF22 and FF23. A signal output from the flip-flop circuit FF20 is input to data input of the flip-flop circuit FF23. A signal output from the flip-flop circuit FF22 is input to data input of the flip-flop circuit FF19.

A control signal EN is input to the other input terminal B13 of the OR gate G13 to which a clock signal CLK is input, so that a gated clock circuit is formed. That is to say, when a control signal EN at the H level is input at normal operation time, a clock signal CLK output to the flip-flop circuits FF22 and FF23 is kept at the H level and the update of data output from the flip-flop circuits FF22 and FF23 is stopped.

In FIG. 4, delay adjustment positions P111, P121, P211, and P221 are shown in advance, but these delay adjustment positions are not included in the layout data 10a input. They will be set by a process in the delay adjustment position setting section 12 described later.

As shown in this example of circuit structure, the semiconductor integrated circuit based on the layout data 10a supplied to the design support unit 1 has a plurality of clock modes. The clock path analysis section 11 detects all clock paths in each clock mode from the layout data 10a. In FIG. 4, one clock path leads to the flip-flop circuits FF19 and FF20 and another clock path leads to the flip-flop circuits FF22 and FF23. Therefore, the following four clock paths will be detected in this circuit structure.

A signal path for a clock signal CLK from input through the cell C11, selector S12, and cells C17 and C18 to the flip-flop circuits FF19 and FF20 is detected as a clock path CP110. A signal path for a clock signal CLK from input through the cell C11, OR gate G13, selector S14, and cell C21 to the flip-flop circuits FF22 and FF23 is detected as a clock path CP120.

Moreover, a signal path for a test clock signal TCK from input through the cell C15, selector S12, and cells C17 and C18 to the flip-flop circuits FF19 and FF20 is detected as a clock path CP210. A signal path for a test clock signal TCK from input through the cell C15, selector S14, and cell C21 to the flip-flop circuits FF22 and FF23 is detected as a clock path CP220.

Furthermore, the clock path analysis section 11 collects delay time in elements on each of the clock paths it detected from the library storage section 15. With the clock path CP110, for example, the clock path analysis section 11 collects delay time in the cell C11, selector S12, and cells C17 and C18 which are on this clock path.

Figure 5:
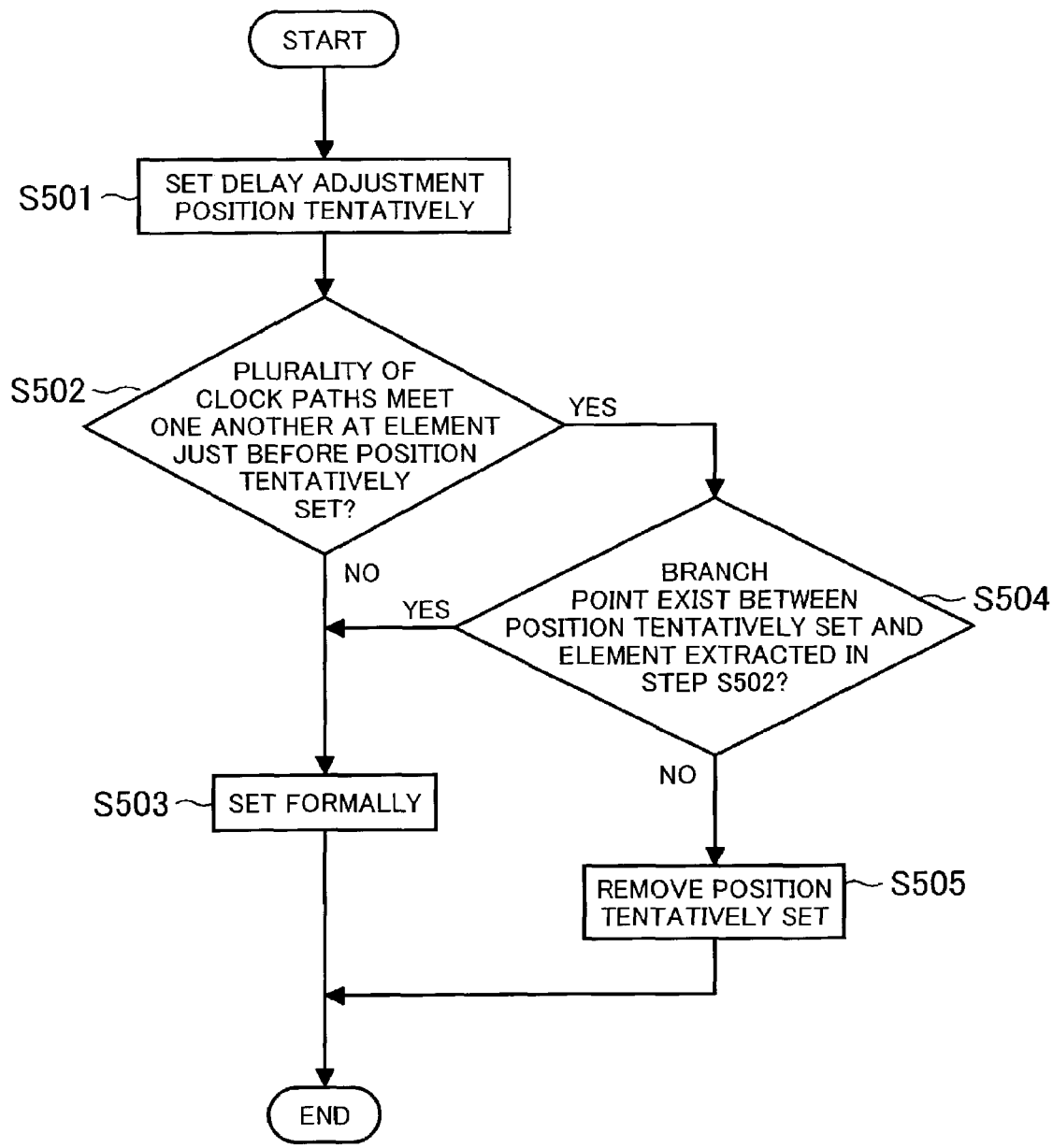
FIG. 5 is a flow chart showing the procedure for setting a delay adjustment position.

Then the delay adjustment position setting section 12 sets a minimum number of delay adjustment positions on each of the clock paths detected by the clock path analysis section 11. FIG. 5 is a flow chart showing the procedure for setting a delay adjustment position.

In step S501, an element, such as a selector, with a plurality of input terminals via which a plurality of clock paths meet one another is extracted from elements on a clock path detected by the clock path analysis section 11 and a position just before an input terminal of this element is set tentatively as a delay adjustment position.

In step S502, whether or not an element located just before the position on the clock path tentatively set is an element where a plurality of clock paths meet one another is judged. If a plurality of clock paths do not meet one another at this element, then in step S503 the position tentatively set is set formally as a regular delay adjustment position. If a plurality of clock paths meet one another at this element, then step S504 is performed.

In step S504, whether or not there is a branch point on the clock path between the position tentatively set and the element extracted in step S502 is judged. If there is a branch point, then in step S503 the position tentatively set is set formally as a regular delay adjustment position. If there is no branch point, then step S505 is performed. In step S505, the position tentatively set is removed and is not set as a regular delay adjustment position.

After that step S501 is repeated on the same clock path and steps S502 through S505 are applied as long as tentative setting can be performed. Then the above procedure will be applied to all of the clock paths detected by the clock path analysis section 11.

Under the above setting procedure, one or more delay adjustment positions are set on all clock paths detected by the clock path analysis section 11. Now, a case where the above setting procedure is applied to the first example of circuit structure shown in FIG. 4 will be described.

First, an element with a plurality of input terminals via which a plurality of clock paths meet one another is extracted from elements on each of the clock paths detected and a position just before an input terminal of this element is set tentatively as a delay adjustment position.

In the circuit structure shown in FIG. 4, the selectors S12 and S14 are extracted as such elements. Therefore, the delay adjustment position P111 is set tentatively just before the input terminal A12 of the selector S12 on the clock path CP110. Similarly, the delay adjustment positions P121, P211, and P221 are set tentatively just before the input terminal A14 of the selector S14 on the clock path CP120, the input terminal B12 of the selector S12 on the clock path CP210, and the input terminal B14 of the selector S14 on the clock path CP220 respectively.

Whether a position tentatively set is set formally as a delay adjustment position or is removed depends on an element located just before the position tentatively set or on whether there is a branch point on a clock path between the position tentatively set and the element. With the delay adjustment position P111 tentatively set, for example, there is no element just before it where a plurality of clock paths meet one another, so this position tentatively set is set formally as the delay adjustment position P111. Similarly, the delay adjustment positions P121, P211, and P221 are set formally.

Under this setting procedure, a minimum number of delay adjustment positions can be set on each of the clock paths CP110, CP120, CP210, and CP220. As described later, a delay element having delay time according to a value calculated by the delay value operation section 13 will be located at each delay adjustment position set. A supplementary explanation of the setting of a delay adjustment position in other examples of circuit structure will be given in FIGS. 8 and 9 described later.

Then the delay value operation section 13 calculates a delay value needed at each delay adjustment position on the basis of delay time in elements collected by the clock path analysis section 11 so that a clock skew on each clock path will fall within a target range. In the circuit structure shown in FIG. 4, for example, a clock skew for a clock signal CLK input to the flip-flop circuits FF19 and FF20 must match a clock skew for a test clock signal TCK input to the flip-flop circuits FF19 and FF20. Therefore, the delay value operation section 13 calculates delay values needed at the delay adjustment position P111 on the clock path CP110 and the delay adjustment position P211 on the clock path CP210 so that delay time on the clock paths CP110 and CP210 will fall within a predetermined time range.

With a semiconductor integrated circuit where the wiring rule of 0.18 µm is applied and where a clock signal frequency between 100 and 200 MHz is used, for example, a clock skew of about 10 nsec may occur at the clock input stage of a flip-flop circuit. Practically, this clock skew must be reduced to, for example, about 0.5 nsec in the process of a usual clock skew adjustment.

First, the delay value operation section 13 considers delay values at the delay adjustment position P111 set on the clock path CP110, the delay adjustment position P121 set on the clock path CP120, the delay adjustment position P211 set on the clock path CP210, and the delay adjustment position P221 on the clock path CP220 as variables and formulates linear expressions with these variables and delay time in elements on each clock path. To be concrete, the delay value operation section 13 formulates inequalities which mean that the sum of delay time in elements on each of the clock paths CP110, CP120, CP210, and CP220 and delay time in a delay element located at a delay adjustment position on it must fall within a predetermined range.

The following linear expressions (1) and (2), (3) and (4), (5) and (6), and (7) and (8) are formulated for the clock paths CP110, CP120, CP210, and CP220 respectively, where $D\_n$ is delay time in element n, $D\_n\_a\_x$ is delay time from input terminal a to output terminal x in element n, $DX\_n$ is delay time at delay adjustment position n and is a variable greater than zero, and $D\_path\_n\_max$ and $D\_path\_n\_min$ are the maximum and minimum values, respectively, of delay time needed on the entire clock path n.

(Numerical expression 1)

$$D\_C11+DX\_P111+D\_S12\_A12\_X12+D\_C17+ \\ D\_C18 > D\_path\_CP110\_min \quad (1)$$

$$D\_C11+DX\_P111+D\_S12\_A12\_X12+D\_C17+ \\ D\_C18 < D\_path\_CP110\_max \quad (2)$$

$$D\_C11+D\_G13\_A13\_X13+DX\_P121+D\_S14\_ \\ A14\_X14+D\_C21 > D\_path\_CP120\_min \quad (3)$$

$$D\_C11+D\_G13\_A13\_X13+DX\_P121+D\_S14\_ \\ A14\_X14+D\_C21 < D\_path\_CP120\_max \quad (4)$$

$$D\_C15+DX\_P211+D\_S12\_B12\_X12+D\_C17+ \\ D\_C18 > D\_path\_CP210\_min \quad (5)$$

$$D\_C15+DX\_P211+D\_S12\_B12\_X12+D\_C17+ \\ D\_C18 < D\_path\_CP210\_max \quad (6)$$

$$D\_C15+DX\_P221+D\_S14\_B14\_X14+D\_ \\ C21 > D\_path\_CP220\_min \quad (7)$$

$$D\_C15+DX\_P221+D\_S14\_B14\_X14+D\_ \\ C21 < D\_path\_CP220\_max \quad (8)$$

An optimization condition concerning the variables DX_P111, DX_P121, DX_P211, and DX_P221 given by the following expression (9) is added. Optimization is performed by expression (9) so that the minimum values of the variables DX_P111, DX_P121, DX_P211, and DX_P221 will be obtained.

(Numerical expression 2)

$$DX\_P111+DX\_P121+DX\_P211+ \\ DX\_P221 -> minimum \quad (9)$$

By performing optimization with linear expressions (1) through (8) and expression (9) as a constraint and objective function respectively and finding the values of the variables DX_P111, DX_P121, DX_P211, and DX_P221 by linear programming, delay values at the delay adjustment positions P111, P121, P211, and P221 which will satisfy clock skews at the flip-flop circuits FF19, FF20, FF22, and FF23 are calculated.

With the above linear expressions (1) through (8), conditions concerning the entire delay time are set only on the basis of the sum of delay time in elements located on the clock paths CP110, CP120, CP210, and CP220. However, linear expressions may be formulated with not only such delay time but also wiring delay time due to, for example, the length of a wiring between elements on each of the clock paths CP110, CP120, CP210, and CP220 taken into consideration. By doing so, clock skews can be adjusted more accurately.

Then the circuit correction section 14 locates delay elements having delay time corresponding to the values of the variables DX_P111, DX_P121, DX_P211, and DX_P221 calculated by the delay value operation section 13 at the delay adjustment positions P111, P121, P211, and P221 to correct circuit structure. There are two methods for correcting circuit structure. One method is to select a proper cell from delay element cells stored in advance in a library and to insert it. The other method is to combine circuit data for single delay elements stored in advance in a library, to create circuit data having delay time needed, and to locate it at a delay adjustment position.

Figure 6:
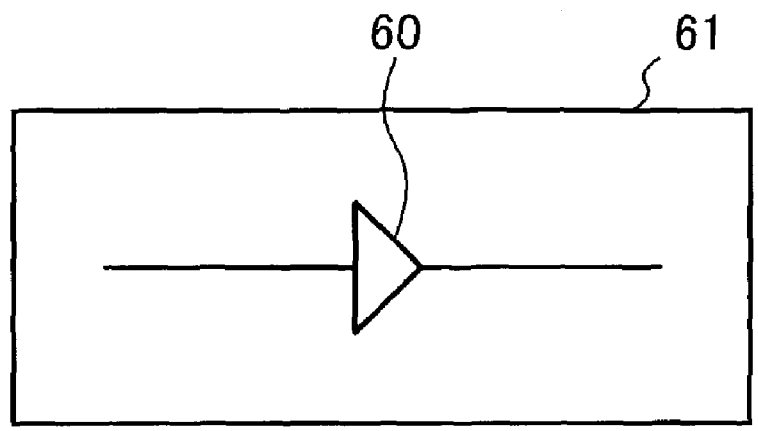
FIG. 6 is a view showing examples of delay element cells registered in advance with a library.
Figure 6:
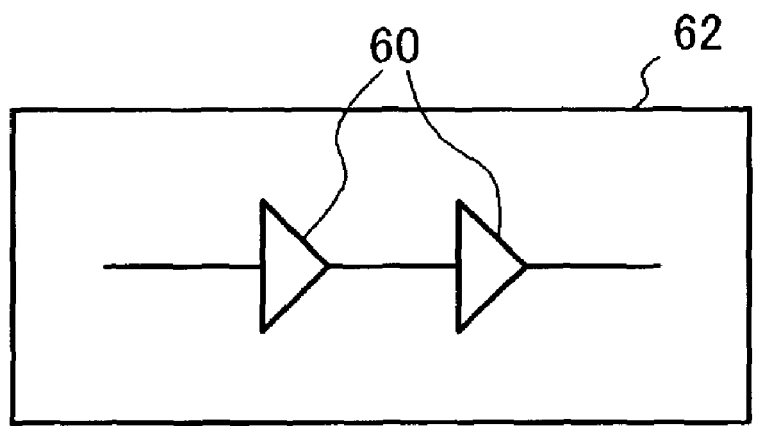
Figure 6:
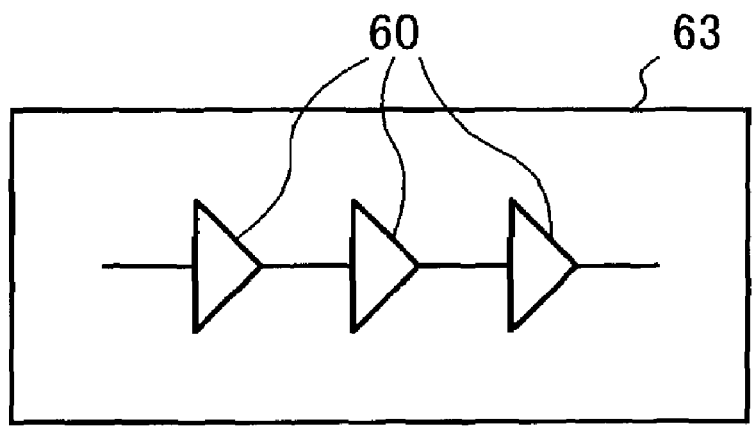

FIG. 6 is a view showing examples of delay element cells registered in advance with a library.

As shown in FIG. 6, three delay element cells 61, 62, and 63, for example, which differ in delay time are registered with a library. Each buffer 60 included in the cells 61, 62, and 63 has the same delay time. The cell 61 includes one buffer 60. The cell 62 includes two buffers 60 connected in series. The cell 63 includes three buffers 60 connected in series. The circuit correction section 14 can select the cells 61, 62, and 63 registered in advance with a library and insert them in circuit structure based on the layout data 10a.

Figure 7:
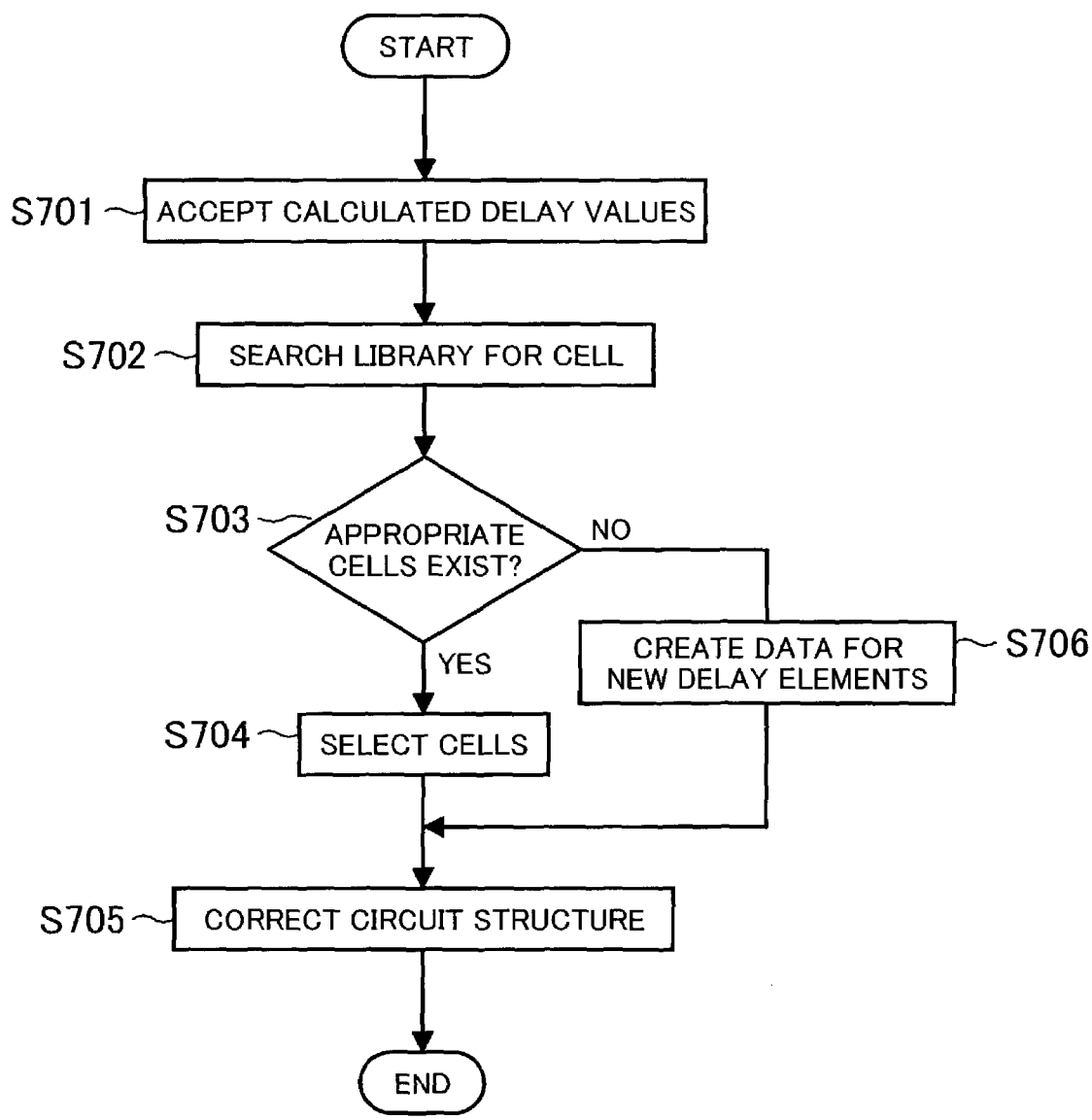
FIG. 7 is a flow chart showing an example of the procedure performed by a circuit correction section for selecting a delay element and correcting circuit structure.

FIG. 7 is a flow chart showing an example of the procedure performed by the circuit correction section 14 for selecting a delay element and correcting circuit structure.

In step S701, the circuit correction section 14 accepts the values of the variables DX_P111, DX_P121, DX_P211, and DX_P221 calculated, that is to say, delay values at the delay adjustment positions P111, P121, P211, and P221 from the delay value operation section 13. In step S702, the circuit correction section 14 searches a library stored in the library storage section 15 for delay element cells having appropriate delay time.

In step S703, the circuit correction section 14 judges whether the appropriate delay element cells exist in the library. In this case, the range of delay time for each cell in the library is determined in advance as a selection criterion and cells within the range of delay time for which the calculated delay values fall should be selected. Alternatively, delay element cells in the library which have exactly the same delay time as the calculated delay values may always be selected. If the appropriate delay element cells exist in the library, then step S704 will be performed.

In step S704, the circuit correction section 14 selects the appropriate delay element cells in the library. In step S705, the circuit correction section 14 changes the layout data 10a so that these cells will be located at the predetermined delay adjustment positions, and corrects circuit structure.

If the appropriate delay element cells do not exist in the library in step S703, then step S706 will be performed. In step S706, the circuit correction section 14 refers to the library, combines circuit data for single delay elements stored in advance in the library, and creates data for new delay elements. Then in step S705, the circuit correction section 14 changes the layout data 10a by the use of this data and corrects circuit structure.

To correct circuit structure in step S705, the contents of the netlist 10c corresponding to the layout data 10a may be changed instead of directly changing the layout data 10a. In this case, information regarding the selection and connection of elements in the netlist 10c is changed by the use of the cells selected in step S704 or the data for delay elements created in step S706 and layout data 10b is newly created on the basis of the netlist 10c.

If a delay value calculated by the delay value operation section 13 is zero or close to zero, a delay element will not be located at a delay adjustment position.

As stated above, the design support unit 1 sets a minimum number of delay adjustment positions (in the above example, P111, P121, P211, and P221) on all the clock paths CP110, CP120, CP210, and CP220 in the circuit structure to be corrected, and calculates delay values needed at the delay adjustment positions P111, P121, P211, and P221 by linear programming so that clock skews will be optimized. Then the design support unit 1 automatically inserts necessary delay elements according to the delay values it calculated and automatically creates the layout data 10b in which clock skews have been optimized. Therefore, compared with manual operations by a designer, a change in circuit layout for optimizing clock skews can be made efficiently and accurately in a short period of time.

Moreover, in the above operations by the delay value operation section 13 optimization is performed by the use of expression (9) so that the minimum values of the variables DX_P111, DX_P121, DX_P211, and DX_P221 will be obtained. As a result, the smallest possible value will be calculated as a delay value needed at each of the delay adjustment positions P111, P121, P211, and P221. This reduces the possibility that a delay element the scale of a circuit in which is large is selected by the circuit correction section 14, and prevents an unnecessary element from being inserted. Therefore, the above design support unit 1 minimizes corrections to circuit structure.

In the above embodiment the clock path analysis section 11 detects all clock paths in each clock mode from the layout data 10a. However, clock skews on some clock paths may be optimized by other methods as occasion arises. One of these methods is as follows. A designer detects a clock skew manually and changes the layout of a circuit. However, it is preferable that all clock paths should be detected as in this embodiment. By doing so, clock skews can be optimized efficiently in the shortest period of time.

Figure 8:
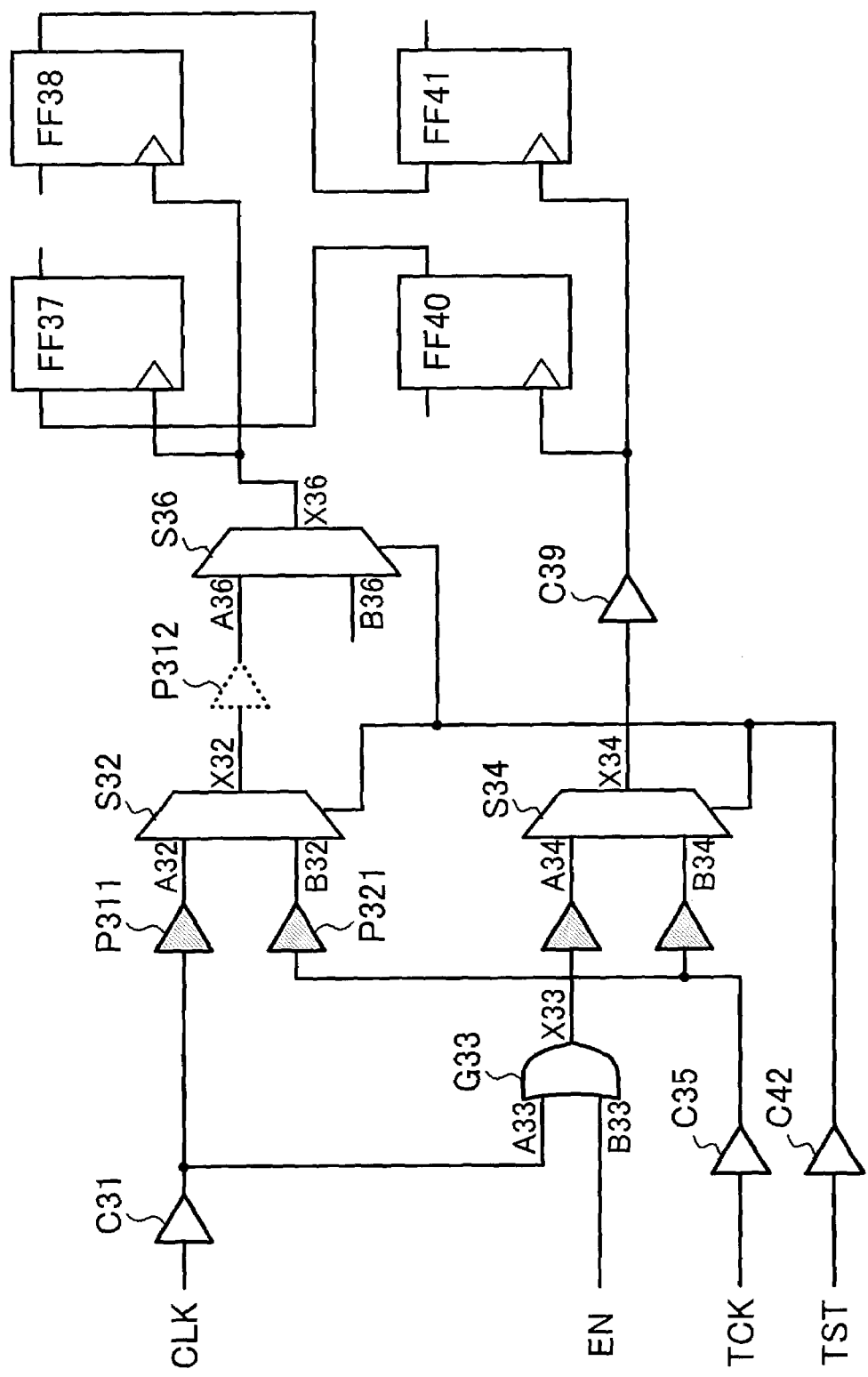
FIG. 8 is a view showing a second example of the circuit structure of a semiconductor integrated circuit given as layout data.
Figure 9:
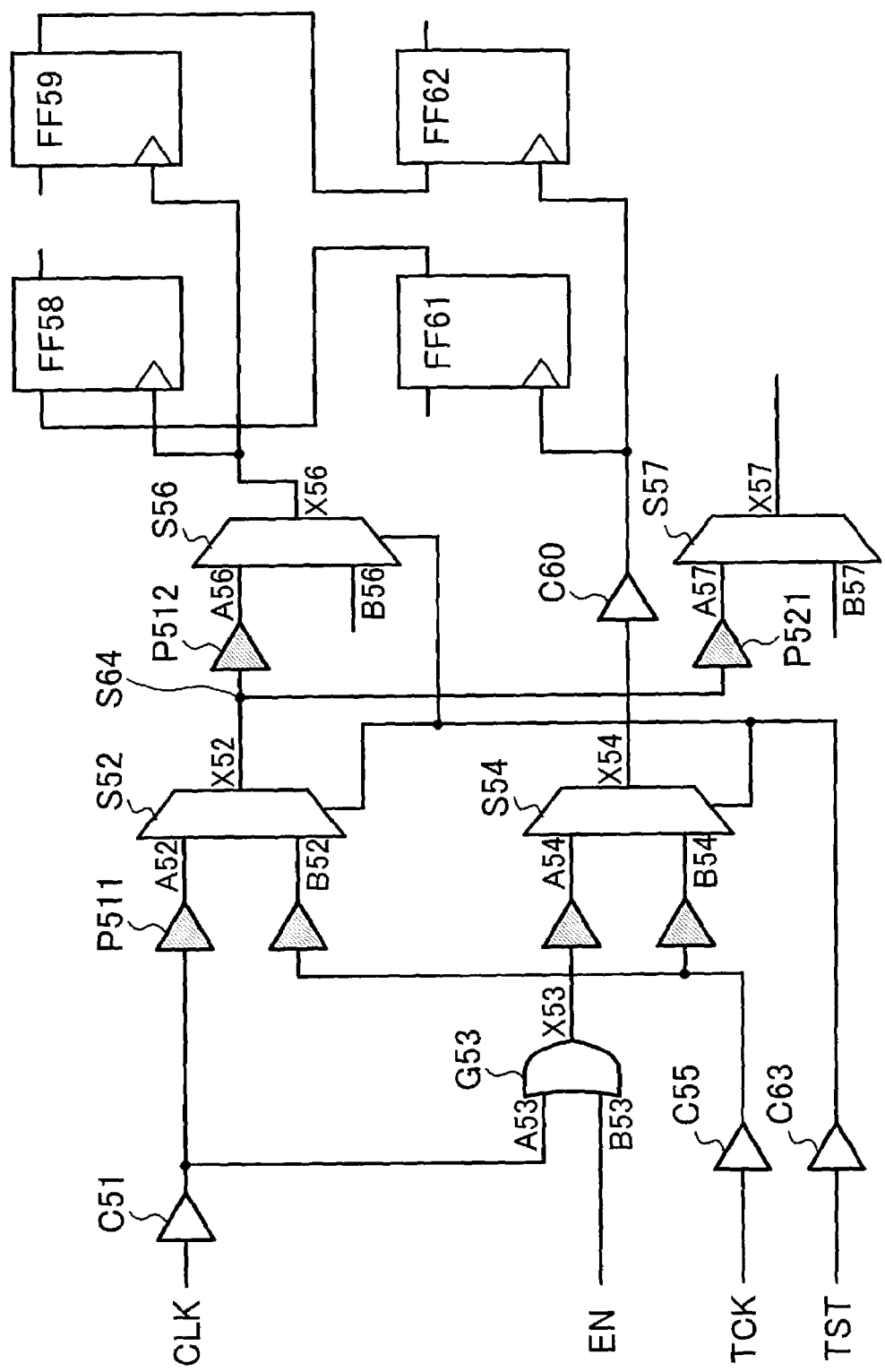
FIG. 9 is a view showing a third example of the circuit structure of a semiconductor integrated circuit given as layout data.
Figure 10:
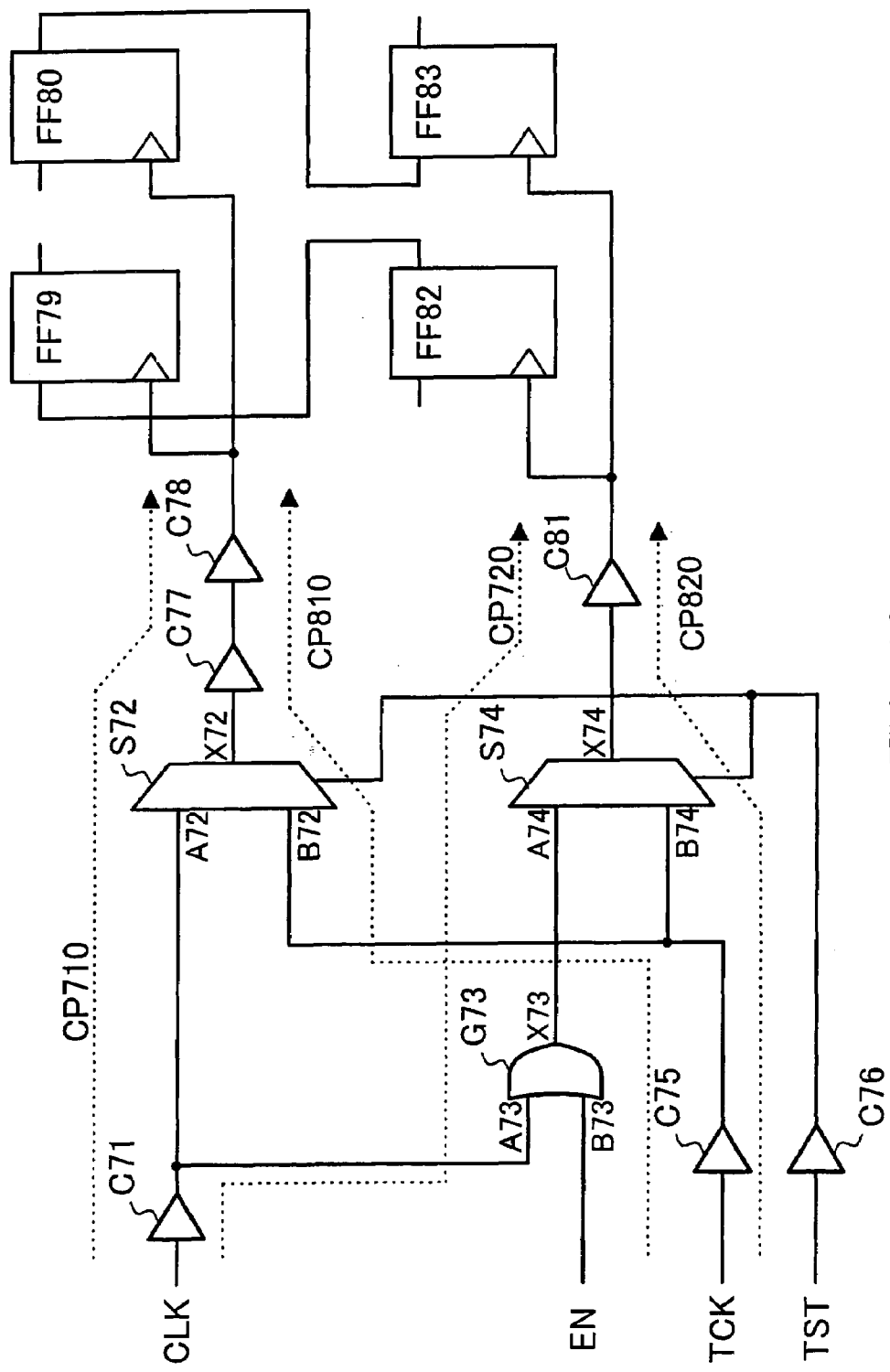
FIG. 10 is a view showing an example of the circuit structure of an LSI having a plurality of clock modes.

Now, a second and third example of circuit structure will be shown in FIGS. 8 and 9, respectively, to give a supplementary explanation of the process performed by the delay adjustment position setting section 12 in the above design support unit 1. FIG. 8 is a view showing a second example of the circuit structure of a semiconductor integrated circuit given as layout data.

FIG. 8 shows an example of the circuit structure of a part of the input end of a semiconductor integrated circuit given as the layout data 10a. Two clock signals are supplied to this circuit. That is to say, a clock signal CLK usually used and a test clock signal TCK used to test the operation of the circuit are supplied. This is the same with the above first example of circuit structure. A clock signal CLK branches via a cell C31. One is supplied to an input terminal A32 of a selector S32 and the other is supplied to an input terminal A34 of a selector S34 via an OR gate G33. A test clock signal TCK branches via a cell C35. One is supplied to an input terminal B32 of the selector S32 and the other is supplied to an input terminal B34 of the selector S34.

A signal output from an output terminal X32 of the selector S32 is input to an input terminal A36 of a selector S36. A signal output from an output terminal X36 of the selector S36 branches and is input to clock input of flip-flop circuits FF37 and FF38. A signal output from an output terminal X34 of the selector S34 branches via a cell C39 and is input to clock input of flip-flop circuits FF40 and FF41. A signal output from the flip-flop circuit FF40 is input to data input of the flip-flop circuit FF37. A signal output from the flip-flop circuit FF38 is input to data input of the flip-flop circuit FF41.

A test signal TST is supplied to the selectors S32, S34, and S36 via a cell C42. In the selectors S32 and S34 switching between output of a clock signal CLK and a test clock signal TCK is performed by this test signal TST. In the selector S36 switching between output of a clock signal CLK or a test clock signal TCK and another clock signal input to an input terminal B36 is performed by a test signal TST. As a result, a clock mode is switched. A control signal EN is input to the other input terminal B33 of the OR gate G33 to which a clock signal CLK is input, so that a gated clock circuit is formed.

If the above second example of circuit structure is given, the clock path analysis section 11 detects, for example, a signal path from input through the cell C31, selector S32, and selector S36 to the flip-flop circuits FF37 and FF38 as a clock path for a clock signal CLK. The delay adjustment position setting section 12 will determine a delay adjustment position on this clock path in the following way.

First, the selectors S32 and S36 are extracted as elements with a plurality of input terminals via which a plurality of clock paths meet one another from elements on this clock path. Therefore, delay adjustment positions P311 and P312 are set tentatively just before the input terminal A32 of the selector S32 and the input terminal A36 of the selector S36, respectively, on this clock path.

Whether a position tentatively set is set formally as a delay adjustment position or is removed depends on an element located just before the position tentatively set or on whether there is a branch point on the clock path between the position tentatively set and the element. With the delay adjustment position P311 tentatively set, there is no element just before it where a plurality of clock paths meet one another, so this position tentatively set is set formally as the delay adjustment position P311.

In contrast, the selector S32 where a plurality of clock paths meet one another is located just before the delay adjustment position P312. In this case, whether or not there is a branch point on the clock path between the output terminal X32 of the selector S32 and the input terminal A36 of the selector S36 is judged. In this example, there is no branch point, so the delay adjustment position P312 will be removed. The reason for this is as follows. Two clock paths meet each other at the selector S32. On these clock paths delay adjustment positions P311 and P321 are set just before the meeting point, that is to say, just before the input terminals A32 and B32, respectively, of the selector S32. As a result, the delay adjustment position P312 located behind the meeting point duplicates and becomes unnecessary. The delay adjustment position setting section 12 will set a minimum number of delay adjustment positions in this way.

FIG. 9 is a view showing a third example of the circuit structure of a semiconductor integrated circuit given as layout data.

FIG. 9 shows an example of the circuit structure of a part of the input end of a semiconductor integrated circuit given as the layout data 10a. Two clock signals are supplied to this circuit. That is to say, a clock signal CLK usually used and a test clock signal TCK used to test the operation of the circuit are supplied. This is the same with the above first and second example of circuit structure. A clock signal CLK branches via a cell C51. One is supplied to an input terminal A52 of a selector S52 and the other is supplied to an input terminal A54 of a selector S54 via an OR gate G53. A test clock signal TCK branches via a cell C55. One is supplied to an input terminal B52 of the selector S52 and the other is supplied to an input terminal B54 of the selector S54.

A signal output from an output terminal X52 of the selector S52 branches and is input to an input terminal A56 of a selector S56 and an input terminal A57 of a selector S57. A signal output from an output terminal X56 of the selector S56 branches and is input to clock input of flip-flop circuits FF58 and FF59.

A signal output from an output terminal X54 of the selector S54 branches via a cell C60 and is input to clock input of flip-flop circuits FF61 and FF62. A signal output from the flip-flop circuit FF61 is input to data input of the flip-flop circuit FF58. A signal output from the flip-flop circuit FF59 is input to data input of the flip-flop circuit FF62.

A test signal TST is supplied to the selectors S52, S54, S56, and S57 via a cell C63. In the selectors S52 and S54 switching between output of a clock signal CLK and a test clock signal TCK is performed by this test signal TST. In the selector S56 switching between output of a clock signal CLK or a test clock signal TCK and another clock signal input to an input terminal B56 is performed by a test signal TST. As a result, a clock mode is switched. Similarly, in the selector S57 switching between output of a clock signal CLK or a test clock signal TCK and another clock signal input to an input terminal B57 is performed by a test signal TST. A control signal EN is input to the other input terminal B53 of the OR gate G53 to which a clock signal CLK is input, so that a gated clock circuit is formed.

If the above third example of circuit structure is given, the clock path analysis section 11 detects, for example, a signal path from input through the cell C51, selector S52, and selector S56 to the flip-flop circuits FF58 and FF59 as a clock path for a clock signal CLK. The delay adjustment position setting section 12 will determine a delay adjustment position on this clock path in the following way.

First, the selectors S52 and S56 are extracted as elements with a plurality of input terminals via which a plurality of clock paths meet one another from elements on this clock path. Therefore, delay adjustment positions P511 and P512 are set tentatively just before the input terminal A52 of the selector S52 and the input terminal A56 of the selector S56, respectively, on this clock path.

With the delay adjustment position P511 tentatively set, there is no element just before it where a plurality of clock paths meet one another, so this position tentatively set is set formally as the delay adjustment position P511.

The selector S52 where a plurality of clock paths meet one another is located just before the delay adjustment position P512. In this case, there is a branch point S64 on the clock path between the output terminal X52 of the selector S52 and the input terminal A56 of the selector S56. Therefore, this position tentatively set is also set formally as the delay adjustment position P512.

A delay adjustment position P521 is also set just before the input terminal A57 of the selector S57 under the same procedure that is used to set the delay adjustment position P512. A delay adjustment position is reliably set in this way behind the branch point S64 on the clock path.

The above processes performed by the design support unit 1 can be realized with a computer. In this case, a program in which the contents of the functions the design support unit 1 should have are described is provided. The above processes are realized on a computer by executing this program on it. This program can be recorded on a computer-readable record medium. A computer-readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disc (DVD), a digital versatile disc random access memory (DVD-RAM), a compact disc read only memory (CD-ROM), a compact disc recordable (CD-R)/rewritable (CD-RW), or the like. A magneto-optical recording medium can be a magneto-optical disc (MO) or the like.

To place this program on the market, portable record media, such as DVDs or CD-ROMs, on which it is recorded are sold. Alternatively, this program can be stored in a memory in a server computer and be transferred from the server computer to another computer via a network.

When a computer executes this program, the computer will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. In addition, the computer can perform processes in compliance with the program transferred in order from the server computer.

As has been described in the foregoing, with the method for designing semiconductor integrated circuits according to the present invention, delay adjustment positions are specified automatically on a plurality of clock paths detected and delay time at these delay adjustment positions is calculated. Then a delay element having the appropriate delay time is located at each delay adjustment position and the layout of a circuit is corrected. As a result, layout data in which clock skews on a plurality of clock paths detected have been optimized is created automatically and clock skews can be optimized efficiently and accurately in a short period of time.

Furthermore, with the program for designing semiconductor integrated circuits according to the present invention, delay adjustment positions are specified automatically on a plurality of clock paths detected and delay time at these delay adjustment positions is calculated. Then a delay element having the appropriate delay time is located at each delay adjustment position and the layout of a circuit is corrected. As a result, layout data in which clock skews on a plurality of clock paths detected have been optimized is created automatically and clock skews can be optimized efficiently and accurately in a short period of time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for designing a semiconductor integrated circuit having a plurality of clock modes, the method comprising:
  detecting a plurality of clock paths in each of the plurality of clock modes from layout data for the semiconductor integrated circuit;
  collecting delay time in all elements on each of the plurality of clock paths detected;
  setting a delay adjustment position on each of the plurality of clock paths detected;
  calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and the variable, and by working out the linear expression; and
  automatically correcting circuit structure based on the layout data by locating a delay element having appropriate delay time at each of the delay adjustment positions on the basis of the delay value calculated.

2. The method for designing a semiconductor integrated circuit according to claim 1, wherein if a first meeting element with a plurality of input terminals via which the plurality of clock paths meet one another exists on the clock path detected, the delay adjustment position is set just before the input terminal.

3. The method for designing a semiconductor integrated circuit according to claim 2, wherein if a second meeting element where the plurality of clock paths meet one another exists before a position just before the input terminal on the clock path detected and there is no branch point on the clock path between the position just before the input terminal and the second meeting element, the delay adjustment position is not set.

4. The method for designing a semiconductor integrated circuit according to claim 1, wherein when a delay value at the delay adjustment position is calculated, a linear expression by which a sum of the collected delay time in all the elements on each of the plurality of clock paths detected and the variable falls within a predetermined range is formulated and is worked out.

5. The method for designing a semiconductor integrated circuit according to claim 4, wherein when the linear expression is worked out, optimization is performed so that a minimum value of a sum of delay values at all the delay adjustment positions set on the layout data will be obtained, and a value of the variable is calculated by linear programming.

6. The method for designing a semiconductor integrated circuit according to claim 1, wherein after the delay value at the delay adjustment position is calculated, circuit structure based on the layout data is corrected by selecting a cell of the delay element having appropriate delay time from among a group of cells of a delay element prepared in advance.

7. The method for designing a semiconductor integrated circuit according to claim 6, wherein after the cell of the delay element is selected, circuit structure based on the layout data is corrected by adding information regarding connection of the cell of the delay element selected to a netlist corresponding to the layout data.

8. The method for designing a semiconductor integrated circuit according to claim 1, wherein after the delay value at the delay adjustment position is calculated, circuit structure based on the layout data is corrected by combining data for single delay elements prepared in advance and creating data for a new delay element having appropriate delay time.

9. The method for designing a semiconductor integrated circuit according to claim 8, wherein after the new delay element is produced, circuit structure based on the layout data is corrected by adding information regarding connection of the new delay element to a netlist corresponding to the layout data.

10. The method for designing a semiconductor integrated circuit according to claim 1, wherein clock paths in each of the plurality of clock modes are detected from the layout data.

11. A method for designing a semiconductor integrated circuit having a plurality of clock modes, the method comprising:
    detecting a plurality of clock paths in each of the plurality of clock modes from layout data for the semiconductor integrated circuit;
    collecting delay time in all elements and on all wiring lines on each of the plurality of clock paths detected;
    setting a delay adjustment position on each of the plurality of clock paths detected;
    calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and on all the wiring lines and the variable, and by working out the linear expression; and
    automatically correcting circuit structure based on the layout data by locating a delay element having appropriate delay time at each of the delay adjustment positions on the basis of the delay value calculated.

12. A design program for designing a semiconductor integrated circuit having a plurality of clock modes, the program causing a computer to perform the processes of:
    detecting a plurality of clock paths in each of the plurality of clock modes from layout data for the semiconductor integrated circuit;
    collecting delay time in all elements on each of the plurality of clock paths detected;
    setting a delay adjustment position on each of the plurality of clock paths detected;
    calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and the variable, and by working out the linear expression; and
    automatically correcting circuit structure based on the layout data by locating a delay element having appropriate delay time at each of the delay adjustment positions on the basis of the delay value calculated.

13. The design program for designing a semiconductor integrated circuit according to claim 12, wherein if a first meeting element with a plurality of input terminals via which the plurality of clock paths meet one another exists on the clock path detected, the delay adjustment position is set just before the input terminal.

14. The design program for designing a semiconductor integrated circuit according to claim 13, wherein if a second meeting element where the plurality of clock paths meet one another exists before a position just before the input terminal on the clock path detected and there is no branch point on the clock path between the position just before the input terminal and the second meeting element, the delay adjustment position is not set.

15. The design program for designing a semiconductor integrated circuit according to claim 12, wherein when a delay value at the delay adjustment position is calculated, a linear expression by which a sum of the collected delay time in all the elements on each of the plurality of clock paths detected and the variable falls within a predetermined range is formulated and is worked out.

16. The design program for designing a semiconductor integrated circuit according to claim 15, wherein when the linear expression is worked out, optimization is performed so a the minimum value of a sum of delay values at all the delay adjustment positions set on the layout data will be obtained, and a value of the variable is calculated by linear programming.

17. The design program for designing a semiconductor integrated circuit according to claim 12, wherein after the delay value at the delay adjustment position is calculated, circuit structure based on the layout data is corrected by selecting a cell of the delay element having appropriate delay time from among a group of cells of a delay element prepared in advance.

18. The design program for designing a semiconductor integrated circuit according to claim 17, wherein after the cell of the delay element is selected, circuit structure based on the layout data is corrected by adding information regarding connection of the cell of the delay element selected to a netlist corresponding to the layout data.

19. The design program for designing a semiconductor integrated circuit according to claim 12, wherein after the delay value at the delay adjustment position is calculated, circuit structure based on the layout data is corrected by combining data for single delay elements prepared in advance and creating data for a new delay element having appropriate delay time.

20. The design program for designing a semiconductor integrated circuit according to claim 19, wherein after the new delay element is produced, circuit structure based on the layout data is corrected by adding information regarding connection of the new delay element to a netlist corresponding to the layout data.

21. The design program for designing a semiconductor integrated circuit according to claim 12, wherein all clock paths in each of the plurality of clock modes are detected from the layout data.

22. A design program for designing a semiconductor integrated circuit having a plurality of clock modes, the program causing a computer to perform the processes of:
   detecting a plurality of clock paths in each of the plurality of clock modes from layout data for the semiconductor integrated circuit;
   collecting delay time in all elements and on all wiring lines on each of the plurality of clock paths detected;
   setting a delay adjustment position on each of the plurality of clock paths detected;
   calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and on all the wiring lines and the variable, and by working out the linear expression; and
   automatically correcting circuit structure based on the layout data by locating a delay element having appropriate delay time at each of the delay adjustment positions on the basis of the delay value calculated.

23. A design support unit for designing a semiconductor integrated circuit having a plurality of clock modes, the unit comprising:
   a clock path analysis section detecting a plurality of clock paths in each of the plurality of clock modes from layout data for the semiconductor integrated circuit and collecting delay time in all elements on each of the plurality of clock paths detected;
   a delay adjustment position setting section setting a delay adjustment position on each of the plurality of clock paths detected;
   a delay value calculation section calculating an optimum delay value at the delay adjustment position on each of the plurality of clock paths by considering delay time at the set delay adjustment position as a nonnegative variable, by formulating a linear expression for each of the plurality of clock paths by use of the collected delay time in all the elements and the variable, and by working out the linear expression; and
   a circuit correction section automatically correcting circuit structure based on the layout data by locating a delay element having appropriate delay time at each of the delay adjustment positions on the basis of the delay value calculated.

\* \* \* \* \*